No. 767,600. Patented August 16, 1904.

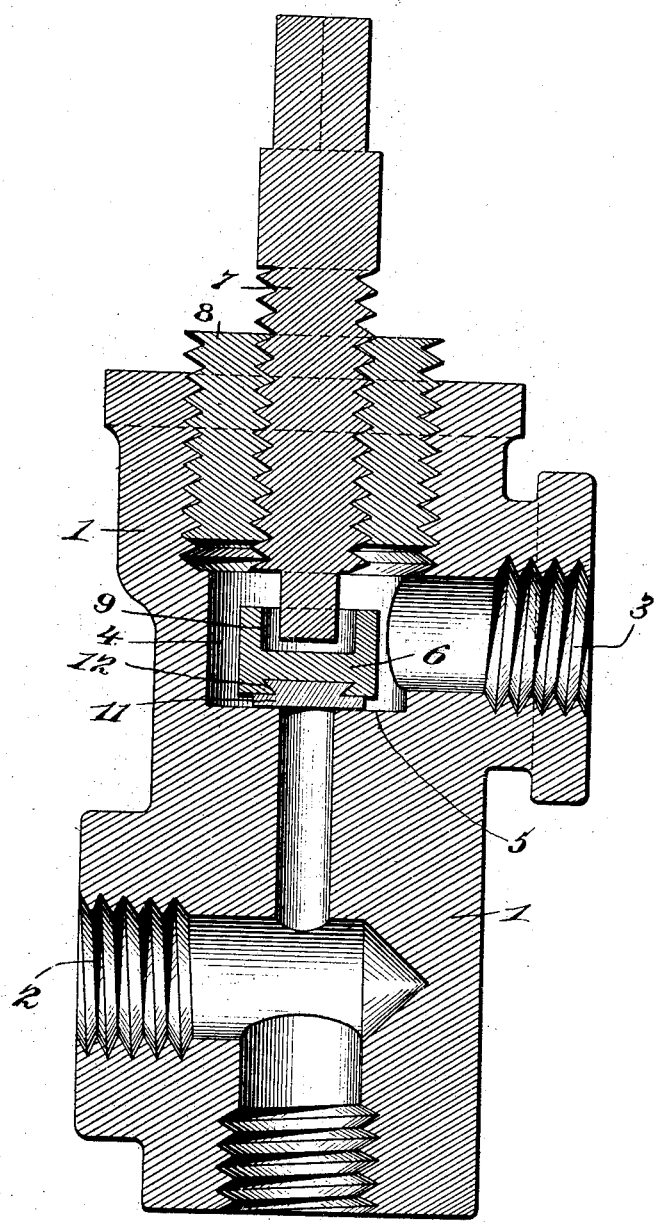

UNITED STATES PATENT OFFICE.

MAGNUS SJOBERG, OF McKEESPORT, PENNSYLVANIA, ASSIGNOR TO NATIONAL TUBE COMPANY, OF PITTSBURG, PENNSYLVANIA, A CORPORATION OF NEW JERSEY.

HYDRAULIC VALVE.

SPECIFICATION forming part of Letters Patent No. 767,600, dated August 16, 1904.

Application filed May 18, 1903. Serial No. 157,704. (No model.)

*To all whom it may concern:*

Be it known that I, MAGNUS SJOBERG, a resident of McKeesport, in the county of Allegheny and State of Pennsylvania, have invented a new and useful Improvement in Hydraulic Valves; and I do hereby declare the following to be a full, clear, and exact description thereof.

My invention relates to valves, and more especially to valves used in connection with hydraulic testing apparatus and the like.

The object of my invention is to provide a valve for this purpose wherein the seating portion does not wear out as rapidly as in ordinary valves and which can be quickly renewed when worn out.

In hydraulic testing apparatus and other relations wherein water is used at a high pressure the valves and valve-seats are very quickly cut out by reason of the dirt or gritty matter contained in the water. Heretofore these valves have been made of hard brass and the valve-stem of steel; but as soon as the valve becomes leaky the gritty water under high pressure very soon wears the valve out or cuts it so that it has to be thrown away.

The object of my invention is provide a valve for these purposes wherein the above defects are overcome, and to this end it comprises a valve having a seating portion formed of soft metal which is compressible, so that it does not become leaky as quickly as the hard valves, which is so arranged that it is free to move laterally with reference to the seat, so that it will not seat itself twice in exactly the same place, and hence offers less chance for gritty water to cut it out, and which also can be readily removed and renewed when worn out.
In the accompanying drawing is shown a section through one form of valve, showing my improvement applied thereto.

In the valve shown, 1 indicates the casing, which may be of any desired construction and will vary according to the location or use to which it is to be placed. It is provided with the inlet 2, outlet 3, valve-chamber 4, and valve-seat 5 and will be made of any desirable metal, such as iron, brass, or the like.

In the valve-casing, 1 is the valve proper or valve-plug 6, which is adapted to coöperate with the seat 5 to close the passage through the casing. This valve-plug may be operated by any suitable means, such as the screw-stem 7, which passes through a suitable bushing 8, secured in the valve-casing. The valve-plug is so arranged that it is not closely guided in its up-and-down movements and is secured to the stem so that it is free to move laterally with reference thereto. The latter is accomplished by providing the plug on its upper face with a recess 9 of larger diameter than the lower end of the stem 7.

In order to enable the valve to be easily and quickly renewed when worn and also to make it less liable to leak, I provide a seating portion 11, of soft metal—such as ordinary Babbitt metal, white metal, or other suitable soft metal—which will be secured to either the valve-seat 5 or the valve-plug 6, preferably the latter, in any suitable way. A simple and convenient way of so securing the soft metal is by providing the plug on its lower face with a dovetailed or undercut recess 12, into which the soft-metal seat 11 can be forced by merely hammering it into place. This soft-metal seat is preferably secured to the valve-plug rather than to the seat 5, for the reason that the flow of the water through the valve is in such direction that it will impinge against said plug, and it is this portion that usually wears out quickly. I have found that the soft metal for the plug compresses or squeezes tightly against the valve-seat, and hence does not become leaky as rapidly as the old hard valves. Furthermore, the valve can freely move laterally with reference to the seat, so that it will not seat itself twice in exactly the same spot. As a consequence the soft metal will not readily become grooved or scored. In closing the valve the water-pressure is liable to cause the same to vibrate laterally, thus grinding the face of the plug on the seat and obliterating any grooves that may have been formed. The gritty water therefore has no opportunity to cut it out, so that it wears longer than the hard-metal plugs heretofore used. Moreover, when it does become worn out it can be easily melted out or cut out by any suitable tool, and a new seat can be applied by merely hammering or pounding the soft metal down into the dovetail recess in the plug.

This valve is of special use in hydraulic systems where the water under very high pressure is used, as the mud or gritty material in the water when forced against the plug or through small leaks thereon under the high pressure acts to quickly cut out the valve-plug. By my improvement, however, the seat can be quickly renewed, so that the plug itself need not be thrown away, as has heretofore been the practice.

What I claim is—

1. A valve comprising a valve-seat and valve having flat meeting faces, a facing of soft metal applied to one of said members, a valve-stem, and operative connections between said stem and said valve so arranged as to permit the valve to move laterally with respect to the seat.

2. A valve comprising a valve-seat and valve, a facing of soft metal applied to said valve, and a valve-stem engaging the valve by a coöperating projection and recess, said recess being of larger size than the projection whereby, the valve is free to move laterally.

3. A valve comprising a valve-seat and valve, said valve having an undercut recess in its lower face and a recess in its upper face, a valve-stem engaging said latter recess and being of less diameter than said recess, and a seat of soft metal having a portion extending into the undercut recess in the lower face of the valve.

In testimony whereof I, the said MAGNUS SJOBERG, have hereunto set my hand.

MAGNUS SJOBERG.

Witnesses:
   E. P. COREY,
   R. D. JAMES.